Sept. 23, 1941.       F. R. ACKERMAN         2,256,919
              ELECTRIC LIQUID HEATER
              Filed Jan. 20, 1939          3 Sheets-Sheet 1

INVENTOR.
FRANCIS R. ACKERMAN.
BY
Bates, Golrick, & Teas
ATTORNEY

Sept. 23, 1941.   F. R. ACKERMAN   2,256,919
ELECTRIC LIQUID HEATER
Filed Jan. 20, 1939   3 Sheets-Sheet 2

INVENTOR.
FRANCIS R. ACKERMAN.
BY Bates, Golrick, & Teare
ATTORNEYS

Sept. 23, 1941.　　　F. R. ACKERMAN　　　2,256,919
ELECTRIC LIQUID HEATER
Filed Jan. 20, 1939　　　3 Sheets-Sheet 3

INVENTOR.
FRANCIS R. ACKERMAN.
BY Bates, Goldrick & Teare
ATTORNEYS

Patented Sept. 23, 1941

2,256,919

UNITED STATES PATENT OFFICE 2,256,919

ELECTRIC LIQUID HEATER

Francis R. Ackerman, Cleveland, Ohio

Application January 20, 1939, Serial No. 251,909

7 Claims. (Cl. 219—39)

This invention is directed to improvements in electric liquid heaters, and has for its general object the provision of a heater construction which can be manufactured economically, operated efficiently and be durable.

A further object of the present invention is the provision of an electric water heater, wherein the heating element or electric coil is disposed relative to the water vessel or container in such manner as to deliver radiant heat to a wall of the water vessel uniformly over a substantial area.

A further object of the present invention is the provision of an electric water heater construction wherein the water vessel or container is an integral sheet metal structure formed to provide a narrow annular water cavity which is free of all structural projections or obstructions from the water inlet to the water outlet.

Other objects of my invention will become apparent from the following description which refers to the accompanying drawings, illustrating two forms thereof.

Figure 1:
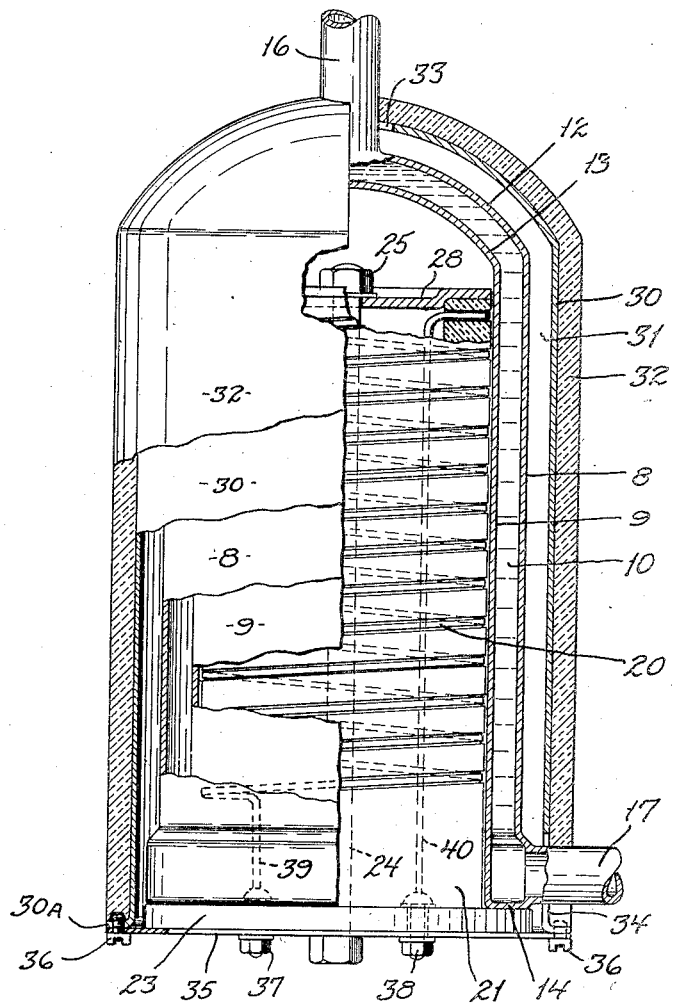
Figure 2:
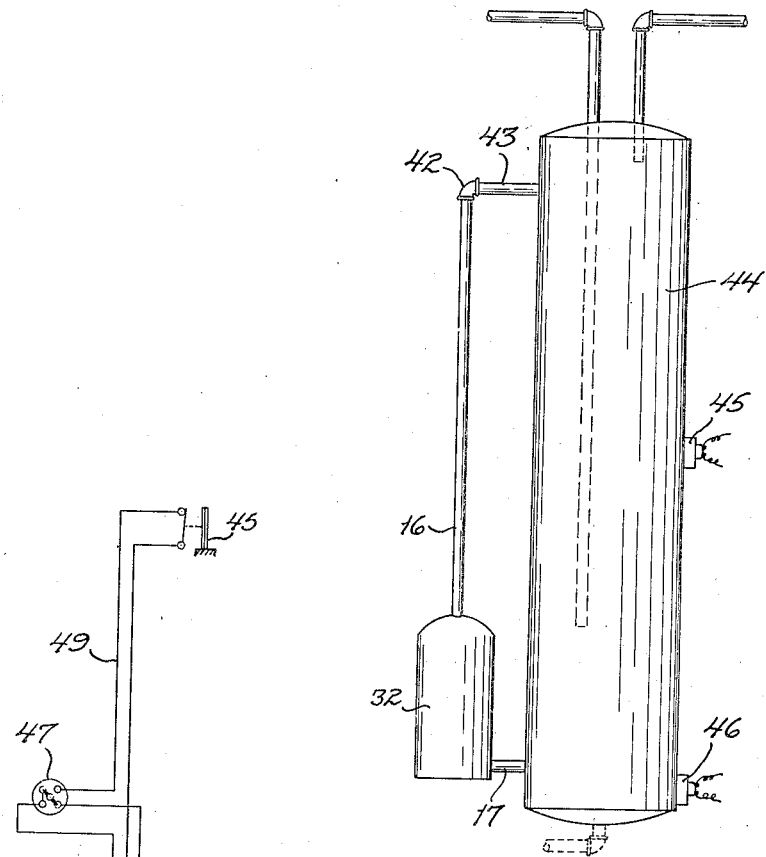
Figure 3:
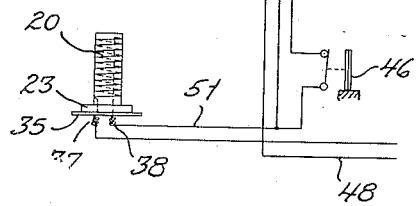
Figure 4:
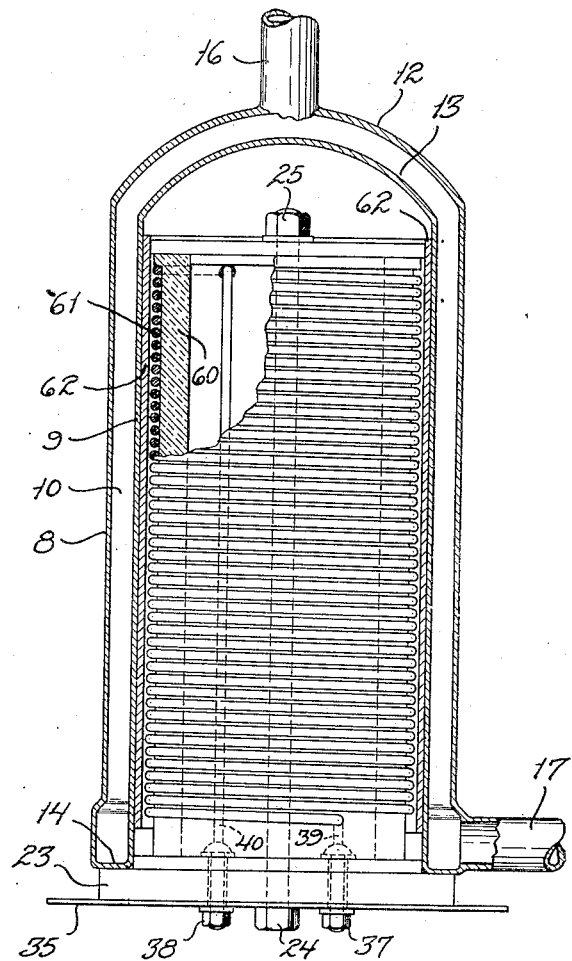

In the drawings, Fig. 1 is a cross-sectional elevation of a heater construction, embodying features of my invention; Fig. 2 is an illustration of the application of the heater unit to a hot water storage tank; Fig. 3 is a wiring diagram illustrating one manner of controlling the heater unit thermostatically and Fig. 4 is a modification of the heater unit illustrated in Fig. 1.

My invention contemplates an electric heater construction, comprising primarily an outer insulated shell, proportioned to completely enclose a water vessel, the water compartment of which is annular, whereby an electric coil can be enclosed by the water vessel, and the water vessel, heating coil, and outer insulated shell can be completely closed at the bottom by a simple closure structure, which also serves as an insulating means thermally and electrically.

Referring to the drawings, in Fig. 1 I show the water vessel as comprising an outer cylindrical shell 8 and an inner cylindrical shell 9 in spaced relation to the outer shell to provide an annular water cavity 10. Both the outer and inner cylindrical shells 8 and 9 are provided at the top thereof with dome-shaped end portions 12 and 13, spaced apart to the same extent as the cylindrical walls 8 and 9. The lower ends of the cylindrical walls 8 and 9 are integrally joined by a ring portion 14. The dome portion 12 of the outer shell of the water container has integrally joined thereto an outlet branch or pipe 16, located centrally of the entire construction.

A horizontally extending inlet branch 17 is joined to the outer shell portion of the water container at the bottom thereof. It will be noted that the water container structure described embodies no obstructions or projections within the water container, thus affording uniformity of upward flow of the heated water to the outlet 16.

The heating unit is constructed in such manner that the heating coil thereof can be disposed in juxtaposition to the inner surface of the inner cylindrical shell portion 9 of the water container structure, and the coil mounting is such that the heat radiating from the coil is localized relative to this inner shell surface. The heating unit structure is devised in such manner that the heating coil may be supported upon a closure means which may also comprise in part both a thermal and electrical insulation means, whereby the same may comprise a mounting for the terminals of the heating coil and a heat-insulating means to prevent the escape of heat from the interior of the heater.

Referring again to Fig. 1, I show the heating coil 20 wound about a core structure 21, formed of any suitable refractory material. The core 21 has a diameter slightly less than the internal diameter of the cylindrical shell portion 9 of the water container, and is spirally grooved, whereby the turns of the heating coil 20 may rest therein. A main disk or pedestal 23 formed of asbestos board or other suitable thermal and electrical insulating material is secured to the core structure 21 by a centrally located bolt and nut 24 and 25, which extend the length of the core structure. The bolt and nut engage a clamping plate 28. This clamping plate is formed to centralize and stabilize the upper end of the core member 21, as shown.

To insulate the heater unit I provide an outer metallic shell 30 of the same general shape as the shell formation of the water container, and of such dimensions as to provide an air space 31 between the water container and shell 30. This shell member is covered by suitable insulating material 32. The outer shell member is provided with a centrally located top opening 33, for the outlet branch 16 of the water container, and at the bottom is provided with an opening 34 in the form of a slot for the insertion of the inlet branch 17. The lower end of the shell member 30 is provided with a flange 30A and a closure plate member 35 secured, to the insulating disk 23, is removably attached to the flange 30A of the outer shell member by any suitable means, such as screw members 36. Terminals 37 and

2

38, carried by the closure means, afford electrical connection for the coil leads 39 and 40.

It will be apparent from the foregoing description of the heater unit that the coil and core, the terminals for the coil, together with the pedestal 23 and bottom plate 35 may comprise a sub-assembly, the water container structure or shell, together with its inlet and outlet branches comprises another sub-assembly and the outer insulating shell 30 and its insulation covering 32 may comprise the third sub-assembly. The final assembly of the heater unit may be economically and conveniently effected by inserting the water container through the open bottom of the insulating shell 30, whereupon the heating coil and core may then be inserted within the central cavity of the water container and the entire assembly maintained by insertion of the screw members 36.

In Fig. 2 I show one application of the heating unit to the hot water storage tank, the heater unit being supported on the tank by the inlet branch 17, the outlet branch or pipe 16 and an elbow 42 and a top storage tank inlet pipe 43.

The storage tank 44 may be provided with a thermostat 45 inserted into the storage tank at about the middle thereof and a lower thermostat 46 inserted in the storage tank at the bottom thereof. The electrical connections between the thermostats 45 and 46 are diagrammatically illustrated in Fig. 3, wherein 47 indicates a two-way switch connected to a power line 48. The operation of the switch 47 will close the line 49 or the line 50, which respectively connect the upper thermostat 45 and lower thermostat 46 to the line 51, which is connected to the input terminal 38 of the heater coil. If only one-half of the storage tank contents is desired to be heated, the switch 47 is operated to connect the thermostat 45 into the power line. Should a full storage tank of hot water be desired, the switch 47 is operated to cut out the upper thermostat 45 and connect the lower thermostat 46. The automatic operation of either thermostat is dependent upon the temperature of the water within the storage tank. Thus, the electric heater is intermittently operated to maintain a constant supply of uniformly temperatured water.

In Fig. 4 I show, in cross-section, a modification of the heating unit of the water heater, it being understood that all other parts, not shown, are the same as illustrated in Fig. 1. The heating unit in the structure shown in Fig. 4 comprises a core member 60 having wound thereabout an induction coil 61, the coil being of such dimension as to have the turns of the coil disposed immediately adjacent a metallic cylinder 62 which is secured to the inner surface of the inner cylindrical shell portion 9 of the water container. This metallic cylinder 62 is preferably formed of sheet iron or sheet steel and comprises a shorted secondary in which current is induced, thus causing heat to be generated. The inner cylindrical shell portion 9, and if desired the entire water vessel may be formed of copper or aluminum and since it is not contemplated that the apparatus will not be heated to a temperature in excess of 200° F., no difficulty, due to the difference in the coefficients of expansions of the cylinder 62 and the shell portion 9 should be encountered.

I claim:

1. In an electric liquid heater, a liquid container comprising annularly spaced inner and outer metallic shell portions of cylindrical shape and integrally joined at the bottom ends thereof, a third cylindrically formed member arranged in spaced relation to the outer shell portion of the liquid container, insulation means surrounding the last-named cylindrical member, an electric heater comprising a core of refractory material having a diameter substantially equal to the inner diameter of the inner shell portion of the liquid container, electric coils spirally formed on the core member and a base member serving only as the sole support for said core and means for securing the base member to said outer cylindrical member.

2. In an electric liquid heater, a liquid container comprising annularly spaced inner and outer metallic shell portions and unjoined dome-shaped upper ends and integrally joined at the bottom ends thereof to an annular ring, a third cylindrically formed shell member having the upper end thereof dome-shaped and arranged in spaced relation to the outer shell portion of the liquid container, an electric heater comprising a hollow core of refractory material having a diameter substantially equal to the inner diameter of the inner shell portion of the liquid container, an electric coil spirally formed on the core member, a base member for the core member, electric terminals carried by the base member, said ring being the liquid inlet and being spaced from and unsupported by said base member.

3. In an electric liquid heater, a liquid container comprising annularly spaced inner and outer metallic shell portions unjoined at one end and integrally joined at the other end thereof, a third cylindrically formed shell member arranged in spaced relation to the outer shell portion of the liquid container, an electric heater comprising a core of refractory material having a diameter substantially equal to the inner diameter of the inner shell portion of the liquid container, an electric coil spirally formed on the core member and a base member serving to support solely said core and the terminals of said coil and means for securing the base member to said outer shell member.

4. In an electric liquid heater, a liquid container comprising spaced-apart inner and outer metallic shell portions annularly joined at the bottoms thereof and unjoined at the tops thereof, inlet and outlet branches joined to the outer shell portion and an insulated shell completely enclosing the annular side and top of the liquid container in spaced relation thereto, the liquid container being insertable into and removable from the insulated shell at the bottom thereof, a core member, an electric coil on the core disposed within the inner annular wall of the liquid container, in juxta-position to the inner surface of said wall, and a bottom closure means for the insulated shell, said closure means also serving as the sole support for said core, said branches being free from said closure means so that the latter and said core comprise a sub-assembly.

5. In an electric liquid heater, a vessel for liquids comprising spaced-apart inner and outer metallic shell portions annularly joined at the bottoms thereof, inlet and outlet branches joined to said vessel, an insulated shell completely enclosing the annular side and top of the liquid vessel in spaced relation thereto, the liquid vessel being insertable into and removable from insulated shell at the bottom thereof, a refractory core and an electric coil thereon disposed within the inner annular wall of the liquid vessel in juxta-position to the inner surface of said wall, said refractory core supporting the coil being removable at the bottom of the heater, a bottom closure means for the insulated shell to which the refractory core is fixed, and electric terminals for the heating coil carried by said closure means, said closure means, core, and coil being removable as a unit from and insertable into said liquid vessel without disturbing either of said branches.

6. In an electric liquid heater, comprising a hollow water tank having an annular water cavity provided with inlet and outlet branches joined thereto, and an insulated shell completely enclosing the annular side and top of the tank, a refractory core, an electric coil thereon disposed within the water tank in juxta-position to an inner wall of the tank, and a bottom closure means for the insulated shell to which the refractory core is fixed, said means and said core being removable from and insertable into said water tank without disturbing the liquid therein nor said branches.

7. In an electric fluid heater, a fluid container comprising spaced apart inner and outer metallic shell portions annularly joined at the bottom ends thereof, thus affording a central cavity, inlet and outlet branches communicating therewith, a magnetically permeable cylinder adjacent the inner shell of the fluid container, an electric coil disposed within said cylinder, means independent of said inlet and outlet for closing said cavity and for supporting said coil whereby said coils and said means may be removed without disturbing the contents of said container, and a source of current connected to said coil.

FRANCIS R. ACKERMAN.